(12) United States Patent
Pasqua et al.

(10) Patent No.: US 9,148,353 B1
(45) Date of Patent: Sep. 29, 2015

(54) SYSTEMS AND METHODS FOR CORRELATING COMPUTING PROBLEMS REFERENCED IN SOCIAL-NETWORK COMMUNICATIONS WITH EVENTS POTENTIALLY RESPONSIBLE FOR THE SAME

(75) Inventors: Joseph Pasqua, Menlo Park, CA (US); Mark Bregman, Los Gatos, CA (US)

(73) Assignee: Symantec Corporation, Mountain View, CA (US)

( * ) Notice: Subject to any disclaimer, the term of this patent is extended or adjusted under 35 U.S.C. 154(b) by 1269 days.

(21) Appl. No.: 12/770,171

(22) Filed: Apr. 29, 2010

(51) Int. Cl.
*G06F 15/173* (2006.01)
*H04L 12/26* (2006.01)

(52) U.S. Cl.
CPC .................................. *H04L 43/065* (2013.01)

(58) Field of Classification Search
None
See application file for complete search history.

(56) References Cited

U.S. PATENT DOCUMENTS

| | | | |
|---|---|---|---|
| 7,269,851 B2 | 9/2007 | Ackroyd | |
| 7,831,412 B1 | 11/2010 | Sobel | |
| 7,966,278 B1 | 6/2011 | Satish | |
| 8,219,983 B1 | 7/2012 | Sobel et al. | |
| 8,255,902 B1 | 8/2012 | Satish | |
| 8,381,289 B1 | 2/2013 | Pereira et al. | |
| 8,694,983 B1 | 4/2014 | Sobel et al. | |
| 8,762,987 B1 | 6/2014 | Satish | |
| 8,904,520 B1 | 12/2014 | Nachenberg et al. | |
| 2004/0162724 A1* | 8/2004 | Hill et al. ...................... | 704/231 |
| 2005/0283831 A1 | 12/2005 | Ryu et al. | |
| 2006/0253584 A1 | 11/2006 | Dixon et al. | |
| 2010/0169159 A1* | 7/2010 | Rose et al. ...................... | 705/10 |

OTHER PUBLICATIONS

Sourabh Satish et al; Social Trust Based Security Model; Mar. 31, 2006; U.S. Appl. No. 11/394,846.
Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.
Morris, Margaret E., "Social Networks as Health Feedback Displays", IEEE Internet Computing, vol. 9, Issue 5, IEEE Computer Society, (Sep.-Oct. 2005).
Carey S. Nachenberg, et al.; U.S. Appl. No. 14/535,733; Filed Nov. 7, 2014.

* cited by examiner

*Primary Examiner* — Scott B Christensen
(74) *Attorney, Agent, or Firm* — ALG Intellectual Property, LLC

(57) ABSTRACT

A computer-implemented method for correlating computing problems referenced in social-network communications with events potentially responsible for the same may include: 1) providing a social-network feedback mechanism that enables users to express frustration with computing problems in real time via a social-network service, 2) detecting at least one user communication generated via the social-network feedback mechanism that references at least one computing problem experienced by a user, and then 3) correlating the computing problem referenced in the user communication with at least one event potentially responsible for the computing problem. Various other methods, systems, and computer-readable media are also disclosed.

20 Claims, 8 Drawing Sheets

SYSTEMS AND METHODS FOR CORRELATING COMPUTING PROBLEMS REFERENCED IN SOCIAL-NETWORK COMMUNICATIONS WITH EVENTS POTENTIALLY RESPONSIBLE FOR THE SAME

BACKGROUND

Due to the virtually unlimited number of possible computer hardware and software configurations, computer hardware manufacturers and software developers often depend on feedback from end users in order to identify hardware or software conflicts and other problems. Unfortunately, manufacturers and developers are often unable to motivate end users to provide such feedback without providing the end users with some form of benefit.

Moreover, even if a manufacturer or developer is able to elicit feedback from an end user (e.g., via a survey or poll), this feedback is often received too far removed in time from a computing problem that may have prompted the end user to provide the feedback. As a result, manufacturers and developers often struggle with correlating a computing problem referenced in an end user's complaint with the source of the computing problem. As such, the instant disclosure identifies a need for systems and methods for motivating end users to provide feedback in a timely manner. This disclosure also identifies a need for obtaining information sufficient to identify and correlate one or more events that may be responsible for computing problems referenced in user feedback.

SUMMARY

As will be described in greater detail below, the instant disclosure introduces a feedback mechanism that may enable users to express their frustration with computing problems in real time in fun and creative ways. This disclosure also details various systems and methods for correlating computing problems referenced in user complaints generated using this mechanism with events that are potentially responsible for the same.

In one example, an exemplary method for accomplishing the above tasks may include: 1) providing a social-network feedback mechanism that enables users to express frustration with computing problems in real time via a social-network service, 2) detecting at least one user communication generated via the social-network feedback mechanism that references at least one computing problem experienced by a user, and then 3) correlating the computing problem referenced in the user communication with at least one event potentially responsible for the computing problem.

The social-network feedback mechanism may include software and/or hardware-based components and/or represent all or portions of client-side and/or server-side applications. For example, in one embodiment the social-network feedback mechanism may represent a social-network add-on or application (such as a FACEBOOK application or add-on) hosted by a third-party (such as a security-software publisher) that communicates with the social network via a provided API. In another example, the social-network feedback mechanism may represent a specific social-network channel that is dedicated to the discussion of computing problems.

The social-network feedback mechanism may also represent a local client-side application that enables end users to quickly generate and post communications that express frustration with computing problems to a social-network service. In some examples, this client-side application may include a hardware-based user interface (such as a USB-powered device designed to resemble a "panic" button) that a user may interact with in order to post messages to their social-network service of choice.

In some examples, the social-network feedback mechanism may enable users to generate social-network communications that express frustration with computing problems in fun and creative ways using text and/or graphics. For example, the social-network feedback mechanism may allow a user to perform various animated actions on a graphical representation of a computer and/or components or aspects of the same (e.g., a browser, monitor, DVD-ROM, or the like). For example, the social-network feedback mechanism may allow a user to toss an icon of a computer out of a virtual window, smash an icon of an email envelope or browser, or the like.

In some examples, the social-network feedback mechanism and/or a user of the same may include keywords or tags within the social-network communication in order to ensure that the communication is posted to a desired social-network channel (such as a social-network channel dedicated to the discussion of computing problems) and/or in order to ensure that the communication is detected and logged by a backend service. For example, the social-network feedback mechanism and/or a user of the same may include the tag "#PC_RANT" within a social-network communication (such as a text-based message generated via TWITTER) to indicate that the complaint is to be posted to a social-network channel called "PC RANTS" and/or in order to ensure that a backend service detects and logs this message when searching for the same.

The tags and keywords discussed above may represent general or specific tags or keywords. For example, the social-network feedback mechanism and/or a user of the same may insert the tag "#PC_RANT" within a social-network communication in order to express general frustration with the user's computer. Alternatively, the social-network feedback mechanism and/or a user of the same may insert one or more specific tags (such as "#browser" or "#email") in order to express frustration with a particular aspect of the user's computer. Similarly, the social-network feedback mechanism and/or a user of the same may include graphics that express general frustration with the user's computer (e.g., a "thumbs down" graphic) and/or frustration with a specific component or aspect of the user's computer (e.g., a browser icon, an email icon, a DVD-ROM icon, or the like).

In one example, the systems described herein may correlate the computing problem referenced in the user communication with at least one event that is potentially responsible for the same by collecting, aggregating, and/or analyzing data from the computing device in question and/or thousands or potentially millions of additional computing devices (such as the installation base of a security-software publisher). Examples of the types of data that the systems described herein may collect and analyze include, without limitation, event data (e.g., data logs that identify events, such as the installation of an application, that have occurred in connection with a computing device) and health data (e.g., data that identifies the performance, stability, and/or state of security of a computing device at various points in time). As will be described in greater detail below, by collecting, aggregating, and/or analyzing such data, the systems described herein may accurately identify events that are potentially responsible for causing computing problems referenced in social-network communications. In at least one example, the systems described herein may attempt to resolve such problems upon detecting or identifying the same.

In some examples, the systems described herein may provide users of the social-network feedback mechanism with access to a variety of community-oriented features. For example, the systems described herein may generate and provide access to graphs, charts, and/or other data representations that demonstrate the number of computing problems experienced by a user, each of the user's friends, and/or the user's social-network community as a whole within the last week, the last month, or the last year. In another example, these systems may also generate and provide access to data that identifies the number of computing problems experienced by a user, the user's friends, and/or the user's social-network community as a whole both before and after the occurrence of a specific event, such as the release of a widespread software package (such as an operating-system patch or update).

As will be explained in greater detail below, by providing a feedback mechanism that enables users to express their frustration with computing problems in fun and creative ways (such as via a social-network service), the systems and methods described herein may incentivize users to indicate when they are experiencing computing problems, thereby potentially enabling the accurate identification of points in time when users are experiencing such problems. Moreover, by collecting, aggregating, and/or analyzing this feedback, along with event and/or health data, from thousands or potentially millions of computing devices (such as the installation base of a security-software publisher), these systems and methods may accurately identify and/or resolve events that are potentially responsible for causing such problems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
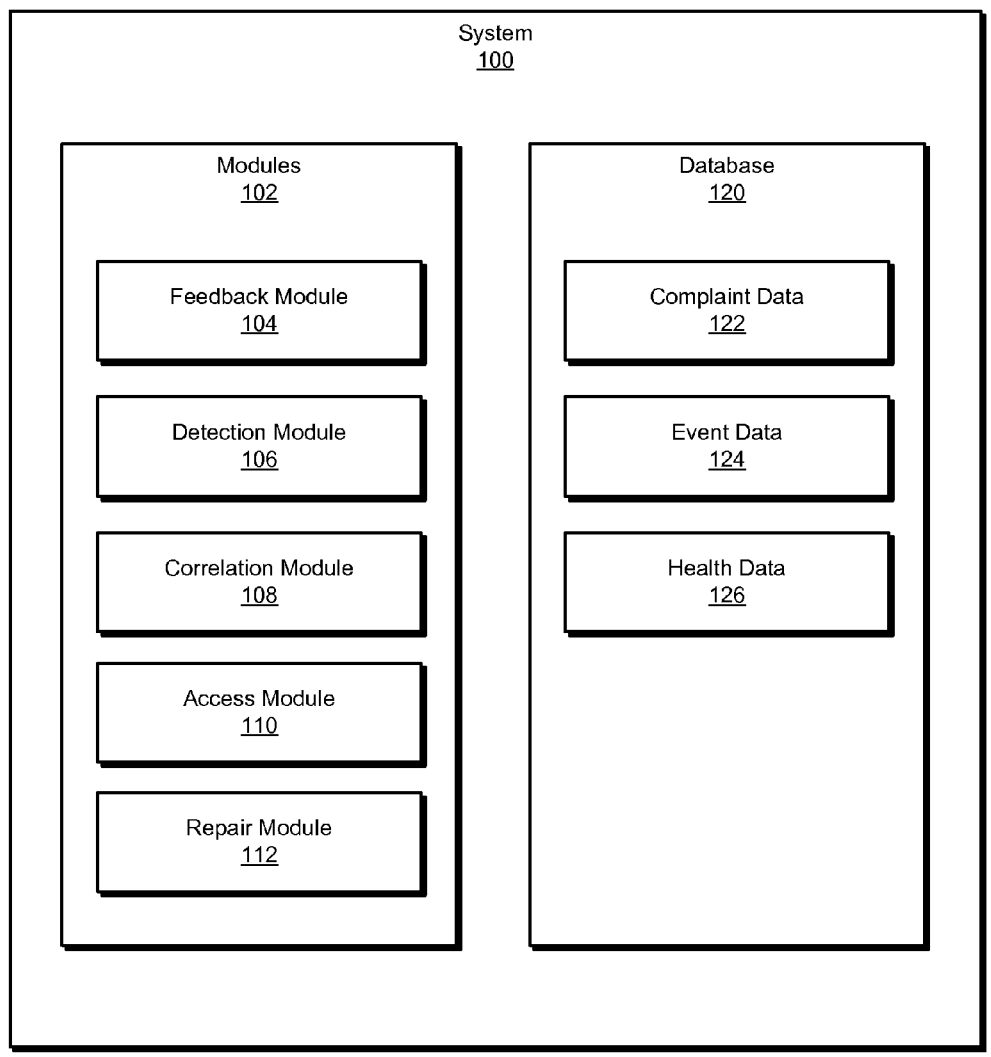
FIG. 1 is a block diagram of an exemplary system for correlating computing problems referenced in social-network communications with events potentially responsible for the same.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
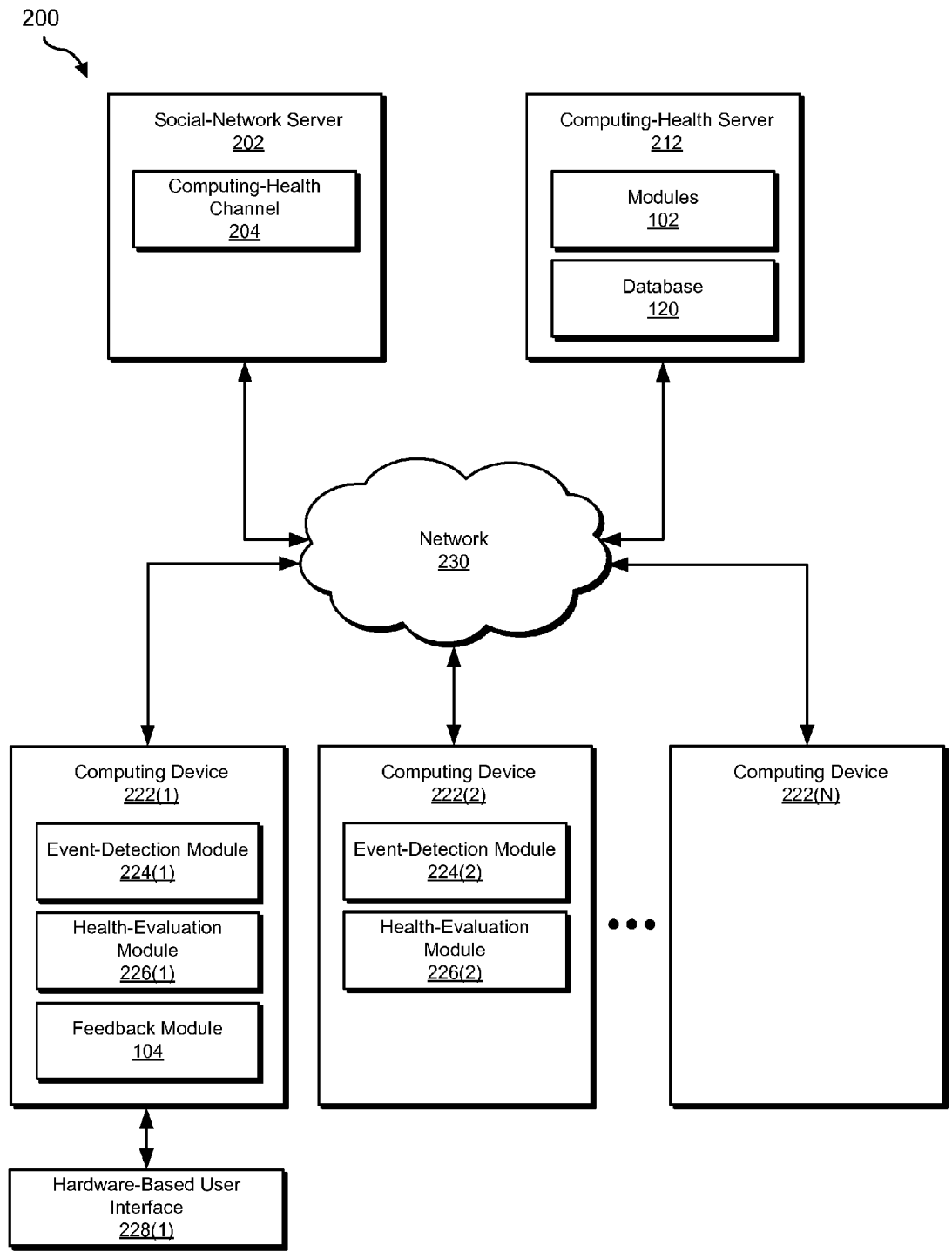
FIG. 2 is a block diagram of an exemplary system for correlating computing problems referenced in social-network communications with events potentially responsible for the same.

The following will provide, with reference to FIGS. 1-2, detailed descriptions of exemplary systems for correlating computing problems referenced in social-network communications with events potentially responsible for the same. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for correlating computing problems referenced in social-network communications with events potentially responsible for the same. As illustrated in this figure, exemplary system 100 may include one or more modules 102 for performing one or more tasks. For example, and as will be explained in greater detail below, exemplary system 100 may include a feedback module 104 programmed to enable users to express frustration with computing problems in real time via a social-network service. Exemplary system 100 may also include a detection module 106 programmed to detect at least one user communication generated via the social-network feedback mechanism that references at least one computing problem experienced by a user. Exemplary system 100 may also include a correlation module 108 programmed to correlate the computing problem referenced in the user communication with at least one event potentially responsible for the same.

In addition, and as will be described in greater detail below, exemplary system 100 may include an access module 110 programmed to provide users of a social-network feedback mechanism with access to various community-oriented features, such as information that identifies the number of computing problems experienced by an individual user of the social-network feedback mechanism and/or users of the social-network feedback mechanism as a whole. Exemplary system 100 may also include a repair module 112 programmed to attempt to resolve the computing problem referenced in the user communication. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., social-network server 202, computing-health server 212, and/or computing devices 222(1)-(N)), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store complaint data 122, event data 124, and/or health data 126, one or more of which may be received and/or collected from a plurality of computing devices, such as computing devices 222(1)-(N) in FIG. 2. As will be explained in greater detail below, complaint data 122 may represent communications generated by users in order to express frustration with computing problems. In addition, event data 124 may represent event logs that identify events that have occurred in connection with a computing device. Similarly, health data 126 may represent information that identifies the "health" (i.e., the performance, stability, and/or state of security) of a computing device at various points in time.

Database 120 may represent portions of a single database or computing device or a plurality of databases or computing devices. For example, database 120 may represent a portion of one or more of the devices illustrated in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as one or more of the devices illustrated in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of exemplary system 200 in FIG. 2. As shown in FIG. 2, system 200 may include a plurality of computing devices 222(1)-(N) in communication with a social-network server 202 and/or a computing-health server 212 via a network 230. In one embodiment, and as will be described in greater detail below, modules 102 from FIG. 1 may program social-network server 202, computing-health server 212, and/or computing devices 222(1)-(N) to: 1) provide a social-network feedback mechanism that enables users (e.g., users of computing devices 222(1)-(N)) to express frustration with computing problems in real time via a social-network service (such as a social-network service provided by social-network server 202), 2) detect at least one user communication generated via the social-network feedback mechanism that references at least one computing problem experienced by a user, and then 3) correlate the computing problem referenced in the user communication with at least one event potentially responsible for the computing problem.

Computing devices 222(1)-(N) generally represent any type or form of computing device capable of reading computer-executable instructions. Examples of computing devices 222(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable computing device. As will be described in greater detail below, computing devices 222(1)-(N) may include none or one or more of an event-detection module 224(1) used for logging events that occur in connection with a computing device, a health-evaluation module 226(1) used for tracking the "health" (e.g., the performance, stability, and/or state of security of a computing device) over time, feedback module 104, and/or a hardware-based user interface 228(1).

Social-network server 202 generally represents any type or form of computing device or devices capable of hosting or providing a social-network service, such as FACEBOOK, MYSPACE, LINKEDIN, TWITTER, or the like. Examples of social-network server 202 include, without limitation, application servers and database servers configured to provide various database services and/or run certain software applications.

Similarly, computing-health server 212 generally represents any type or form of computing device or devices capable of collecting, aggregating, and/or analyzing data from thousands or potentially millions of computing devices (such as the installation base of a security-software publisher) in order to correlate computing problems with events that are potentially responsible for the same.

Network 230 generally represents any medium or architecture capable of facilitating communication or data transfer. Examples of network 230 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 230 may facilitate communication or data transfer using wireless or wired connections. In one embodiment, network 230 may facilitate communication between computing devices 222(1)-(N) and social-network server 202 and/or computing-health server 212.

Figure 3:
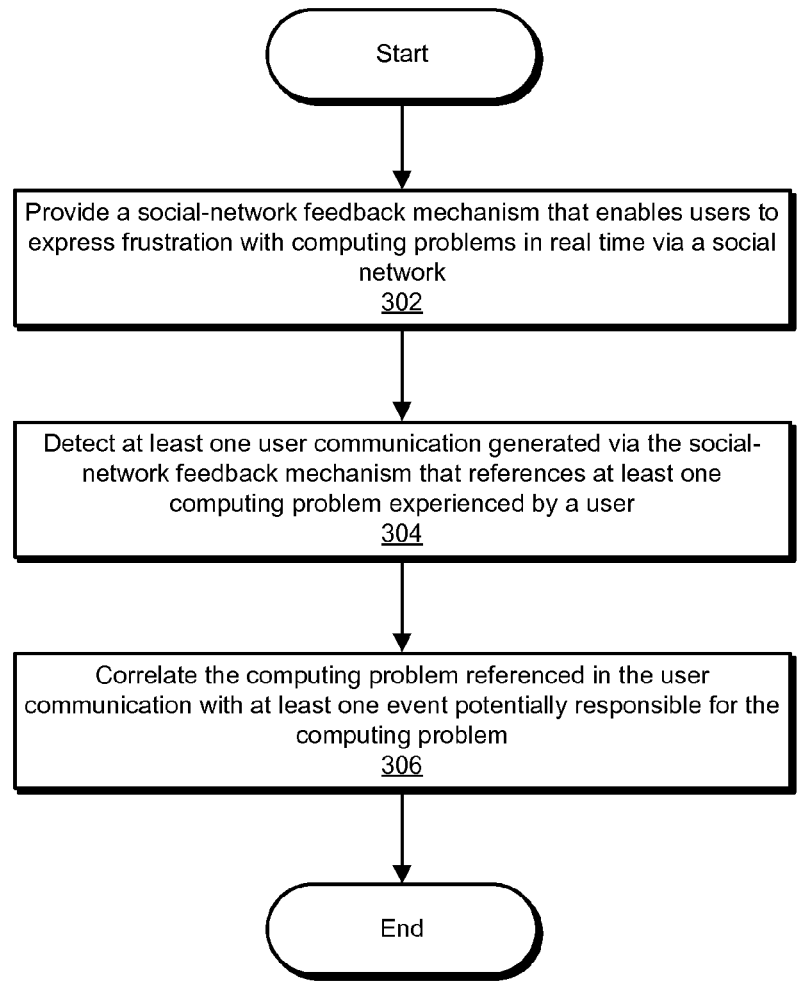
FIG. 3 is a flow diagram of an exemplary method for correlating computing problems referenced in social-network communications with events potentially responsible for the same.

FIG. 3 is a flow diagram of an exemplary computer-implemented method 300 for correlating computing problems referenced in social-network communications with events potentially responsible for the same. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the various systems described herein may provide a social-network feedback mechanism that enables users to express frustration with computing problems in real time via a social-network service. For example, feedback module 104 in FIG. 1 may, as part of social-network server 202, computing-health server 212, and/or computing devices 222(1)-(N) in FIG. 2, enable users to post or generate messages that express their frustration with computing problems they are experiencing in fun and creative ways to a social-network service, such as a social-network service provided by social-network server 202. The term "social-network service," as used herein, may refer to any type or form of computing (e.g., web-based) service that enables users to establish, build, and/or reflect social relationships. Examples of social-network services include, without limitation, FACEBOOK, TWITTER, LINKEDIN, MYSPACE, BEBO, and the like.

The systems described herein may perform step 302 in a variety of ways. In one example, the systems described herein may provide a client-side and/or server-side application that enables users to generate and post messages that express frustration with computing problems they are experiencing to a social-network service. For example, social-network server 202 and/or computing-health server 212 in FIG. 2 may provide or host a social-network service add-on or application (such as a FACEBOOK or MYSPACE add-on) that enables users (e.g., users of computing devices 222(1)-(N)) of a social-network service provided by social-network server 202 to generate or post messages that express frustration with computing problems they are experiencing in fun and creative ways to the social-network service via an API.

In another example, the systems described herein may perform step 302 by providing a channel within a social-network service that is dedicated to the discussion of computing problems. For example, social-network server 202 may host computing-health channel 204. In this example, computing-health channel 204 may be dedicated to the discussion of computing problems experienced by members of the social-network service provided by social-network server 202. In this embodiment, users may post messages that detail or express frustration with computing problems they are experiencing to computing-health channel 204.

Additionally or alternatively, the systems described herein may perform step 302 by providing a local client-side application that enables users to post or generate messages to a social-network service that express frustration with computing problems. For example, computing device 222(1) may include feedback module 104. In this example, feedback module 104 may enable a user of computing device 222(1) to generate and post messages that express frustration with computing problems the user is experiencing to the social-network service provided by social-network server 202.

A user of computing device 222(1) may interact with feedback module 104 using software-based and/or hardware-based user interfaces, such as hardware-based user interface 228(1) in FIG. 2. In one example, hardware-based user interface 228(1) may represent a USB-powered device that is designed to resemble a "panic" button. In this example, when a user of computing device 222(1) experiences a computing problem, the user may push the "panic" button (i.e., hardware-based user interface 228(1)), which may in turn post a message on behalf of the user that expresses the user's frustration with his/her computing device to the social-network service provided by social-network server 202. Additionally or alternatively, when a user of computing device 222(1) experiences a computing problem, the user may click on or select a "thumbs down" graphic displayed in a software-based user interface provided by feedback module 104, which may in turn post a message on behalf of the user that expresses the user's frustration with his/her computing device to the social-network service provided by social-network server 202.

Figure 4:
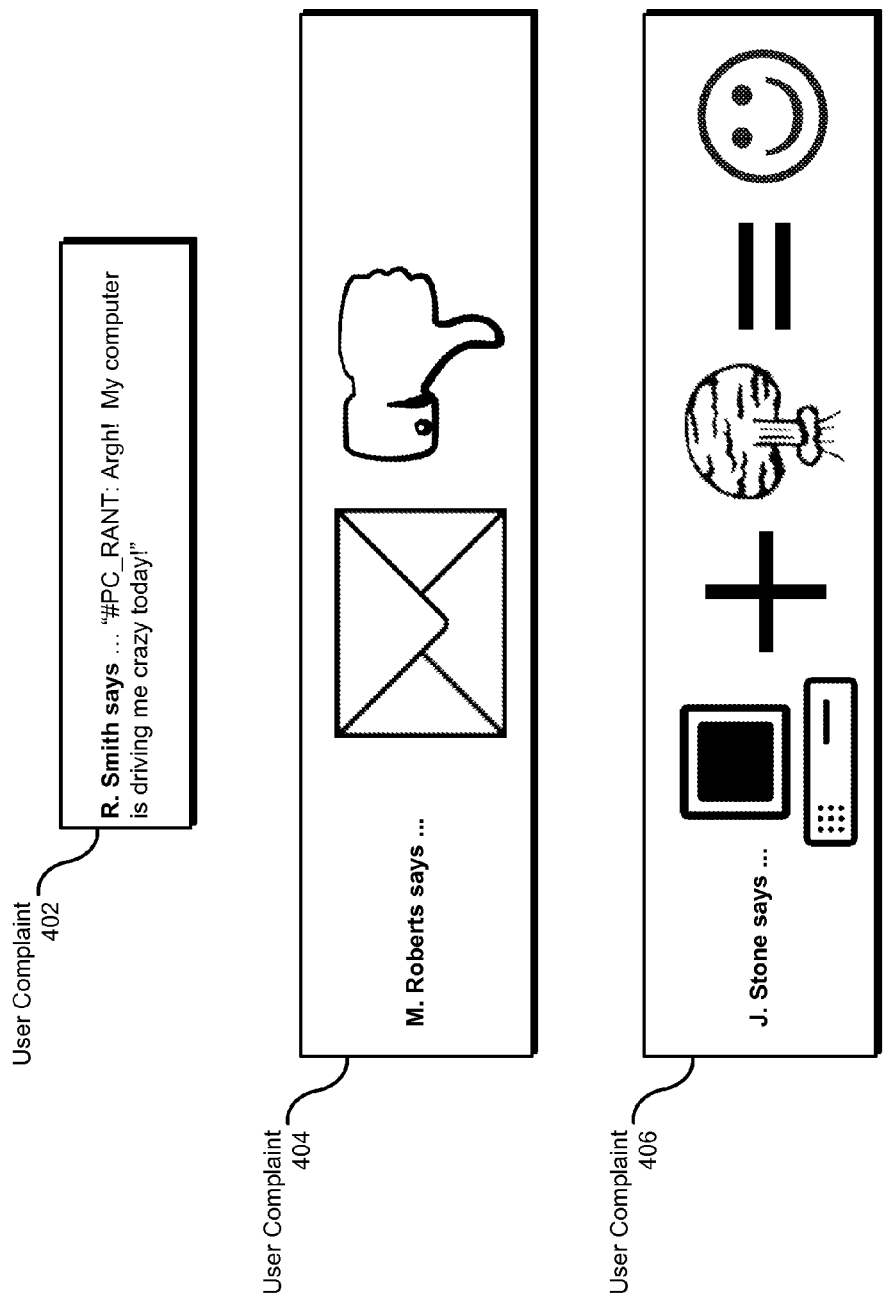
FIG. 4 illustrates a number of exemplary user complaints that may be generated via a social-network feedback mechanism.

The social-network feedback mechanisms described herein may enable users to express their frustration with computing problems in real time in a variety of fun and/or creative ways. For example, these mechanisms may enable users to generate and post messages that contain text and/or graphics that express frustration with computing problems they are experiencing to a social-network service. For example, as illustrated in FIG. 4, these mechanisms may enable a user to generate and post to a social-network service a user complaint 402 that contains text that expresses the user's general frustration with his/her computer (e.g., "Argh! My computer is driving me crazy today!").

In some examples, the social-network feedback mechanism and/or a user of the same may include keywords or tags within the user complaint in order to ensure that the complaint is posted to a desired social-network channel (such as a social-network channel dedicated to the discussion of computing problems) and/or in order to ensure that the complaint is detected and logged by a backend service, such as computing-health server 212. For example, the social-network feedback mechanism and/or a user of the same may include the tag "#PC_RANT" within user complaint 402 to indicate that this complaint is to be posted to a social-network channel called "PC RANTS" (e.g., computing-health channel 204 provided by social-network server 202). Additionally or alternatively, computing-health server 212 may detect social-network communications that express frustration with computing problems by searching for social-network communications that contain specific tags or keywords, such as "#PC_RANT" or "#MADATMYPC."

The tags and keywords discussed above may represent general or specific tags or keywords. For example, the social-network feedback mechanism and/or a user of the same may insert the tag "#PC_RANT" within user complaint 402 in order to express general frustration with the user's computer. Alternatively, the social-network feedback mechanism and/or a user of the same may insert more specific tags (such as "#browser" or "#email") in order to express frustration with a particular aspect of the user's computer.

As detailed above, the social-network feedback mechanism may also enable a user to insert static or animated graphics that allow the user to creatively or amusingly express frustration with computing problems. For example, the social-network feedback mechanism and/or user of the same may generate a user complaint 404 in FIG. 4 that includes graphical representations of an email envelope and a hand with the thumb pointing downwards in order to indicate that the user is experiencing problems with his/her email service. Similarly, the social-network feedback mechanism and/or user of the same may generate a user complaint 406 that includes static and/or animated graphics that suggest that the user would enjoy blowing up his/her computer due to computing problems the user is experiencing. As with the keywords and tags discussed above, these graphics may be used to express a user's general frustration with his/her computer (e.g., a "thumbs down" graphic) and/or frustration with a specific component or aspect of the user's computer (e.g., a browser icon, an email icon, a DVD-ROM icon, or the like).

In some examples, the social-network feedback mechanism may allow a user to input any of a variety of possible combinations of tags and/or graphics in order to creatively express frustration with computing problems. For example, the social-network feedback mechanism may allow a user to perform various animated actions on a graphical representation of a computer and/or components or aspects of the same (e.g., a browser, monitor, DVD-ROM, or the like). For example, the social-network feedback mechanism may allow a user to toss an icon of the computer out of a virtual window, smash an icon of an email envelope or browser, or the like.

In other examples, the social-network feedback mechanism may automatically select the text and/or graphics to include within the user's complaint, either at random or based on a user's preset preferences. For example, if a user of computing device 222(1) experiences a computing problem, then this user may express frustration with the same by hitting a USB-powered "panic" button (e.g., hardware-based user interface 228(1)) and/or by selecting a "thumbs down" icon displayed by feedback module 104 on a display device of computing device 222(1). In this example, feedback module 104 may automatically generate and post (using, e.g., one or more of the various methods described above) user complaint 406 in FIG. 4 to the social-network service provided by social-network server 202 in FIG. 2.

Returning to FIG. 3, at step 304 the systems described herein may detect at least one user communication generated via the social-network feedback mechanism that references at least one computing problem expressed by a user. For example, detection module 106 in FIG. 1 may, as part of social-network server 202 and/or computing-health server 212 in FIG. 2, detect a user complaint (e.g., user complaint 404 in FIG. 4) posted to the social-network service provided by social-network server 202 via feedback module 104.

The systems described herein may perform step 304 a variety of ways. In one example, detection module 106 may detect a social-network communication that references a computing problem experienced by a user by determining that the communication contains a specific keyword or tag (e.g., "#PC_RANT" or "#browser"). For example, detection module 106 may, as part of computing-health server 212 in FIG. 2, search all communications posted to the social-network service provided by social-network server 202 for specific keywords or tags.

In another example, detection module 106 may detect a social-network communication that expresses frustration with a computing problem experienced by a user by detecting communications posted to a specific social-networking channel. For example, detection module 106 may, as part of social-network server 202 and/or computing-health server 212, identify and log all messages posted to social-network channels (such as computing-health channel 204) that are dedicated to the discussion of computing problems.

In an additional example, detection module 106 may detect social-network communications that express frustration with computing problems experienced by users by identifying or detecting communications posted via a specific application. For example, detection module 106 may, as part of one or more of the devices illustrated in FIG. 2, detect (with the user's consent) all messages generated by a specific application or add-on, such as a FACEBOOK application, MYSPACE add-on, client-side application, or the like.

In some examples, detection module 106 may also determine when the user communication detected in step 304 occurred. For example, detection module 106 may analyze a timestamp included within the user communication that identifies when the user communication was generated and/or transmitted. Detection module 106 may also determine when this user communication was received and/or posted to the social-network service. As will be explained in greater detail below, this information may represent a point-in-time indication of when a user is experiencing a computing problem.

Returning to FIG. 3, at step 306 the systems described herein may correlate a computing problem referenced in the user communication detected in step 304 with at least one event that is potentially responsible for the computing problem. For example, correlation module 108 in FIG. 1 may, as part of social-network server 202 and/or computing-health server 212 in FIG. 2, correlate a computing problem referenced in user complaint 404 in FIG. 4 with at least one event that is potentially responsible for the same. Upon completion of step 306, exemplary method 300 in FIG. 3 may terminate.

The systems described herein may perform step 306 in a variety of ways and in a variety of contexts. In one example, correlation module 108 may correlate the computing problem referenced in the user communication detected in step 304 with at least one event that is potentially responsible for the same by collecting, aggregating, and/or analyzing data from one or more computing devices. Examples of the type of data that may be collected, aggregated, and/or analyzed in this manner include, without limitation, event data (e.g., event logs that identify events that have occurred in connection with a computing device) and/or health data (e.g., information that identifies the performance, stability, and/or state of security of a computing device at one or more points in time).

Examples of the types of events that may be detected and included within the event logs collected, aggregated, and/or analyzed by the systems described herein include, without limitation, when a computing device installs, executes, removes, updates, and/or patches application or system software, accesses a file (e.g., an email or attachment thereto), accesses a website, connects to an access point, connects to a network, and/or interacts with an Internet vendor. In addition, examples of the types of health data that may be collected, aggregated, and/or analyzed by the systems described herein include, without limitation, information that identifies the performance of a computing device (e.g., the processor usage, memory usage, network usage, and/or number of page faults experienced by the computing device), the stability of a computing device (e.g., the number of operating-system errors, application errors, service errors, device-driver errors, and/or system reboots experienced by the computing device and/or the total system uptime of the computing device), and/or the state of security of a computing device (e.g., the number of viruses detected on the computing device) at one or more points in time.

In some examples, correlation module 108 may, by collecting, aggregating, and/or analyzing this data, identify at least one event that is potentially responsible for the computing problem referenced in the user communication detected in step 304. For example, correlation module 108 may, as part of one or more of the devices illustrated in FIG. 2, access or receive event data from the computing device responsible for generating the user communication detected in step 304. In this example, correlation module 108 may identify the date and time when the user communication detected in step 304 was generated and then attempt to identify (using, e.g., various heuristics) events within the event data that occurred within a specific temporal range (e.g., events that occurred less than one day prior to generation of the user communication) that may be at least partially responsible for causing the computing problem referenced in the user communication. For example, correlation module 108 may determine, by analyzing event data received from computing device 222(1), that a user of computing device 222(1) downloaded and installed a new application less than two hours prior to posting the user communication detected in step 304. In this example, correlation module 108 may flag this new application as being potentially responsible for causing the computing problem referenced in the user communication detected in step 304. In another example, correlation module 108 may determine the exact point in time when the computing problem referenced in the user communication detected in step 304 occurred by analyzing health data logs received from the user's computing device.

In other examples, correlation module 108 may correlate the computing problem referenced in the user communication detected at step 304 with at least one event that is potentially responsible for the same based on data collected, aggregated, and/or analyzed from thousands or potentially millions of computing devices, such as the user or installation base of a security-software publisher and/or the member base of a social-network service. For example, by detecting, collecting, aggregating, and/or analyzing (using, e.g., one or more heuristics): 1) social-network communications that reference computing problems (as described herein), 2) event data, and/or 3) health data from thousands or potentially millions of computing devices, correlation module 108 may be able to fairly accurately identify events that may be potentially responsible for causing various computing problems.

For example, if correlation module 108 determines that thousands of members of computing-health channel 204 posted social-network communications referencing problems with their operating systems less than 24 hours after the widespread release of an operating-system patch or update, then correlation module 108 may determine that the operating-system update may be at least partially responsible for the operating-system problems experienced by the users. Similarly, if correlation module 108 determines that hundreds of members of computing-health channel 204 posted social-network communications referencing browser-connection problems less than 12 hours after an ISP announces it has begun maintenance on its servers, then correlation module 108 may determine that the ISP's maintenance procedures may be at least partially responsible for the browser-connection problems experienced by the users.

In some examples, the systems described herein may provide users of the social-network feedback mechanism referenced in step 302 with access to a variety of community-oriented features. For example, access module 110 in FIG. 1 may, as part of one or more of the devices illustrated in FIG. 2, provide users of the social-network feedback mechanism referenced in step 302 with access to information that identifies the number of computing problems experienced by each individual user of the social-network feedback mechanism and/or the number of computing problems experienced by users of the social-network feedback mechanism as a whole. For example, access module 110 may generate and provide access to graphs, charts, and/or other data representations that demonstrate the total number of computing problems experienced by a user, each of the user's friends, and/or the user's social-network community as a whole. In some examples, this data may be bound by specific time frames. For example, access module 110 may generate and provide access to data that identifies the number of computing problems experienced by a user, the user's friends, and/or the user's social-network community as a whole within the last week, the last month, or the last year.

Access module 110 may also generate data that compares the number of computing problems experienced by a user, the user's friends, or the user's social-network community as a whole with specific events and/or points in time. For example, access module 110 may generate and provide access to data that identifies the number of computing problems experienced by a user, the user's friends, and/or the user's social-network community as a whole both before and after the release of a widespread software package, such as an operating-system patch or update.

In some examples, the systems described herein may also attempt to resolve the computing problem referenced in the user communication detected in step 304. For example, if correlation module 108 determines that the installation of a new application was at least partially responsible for the computing problem referenced in the user communication detected in step 304, then repair module 112 may uninstall (or instruct a user to uninstall) the application in question.

Figure 5:
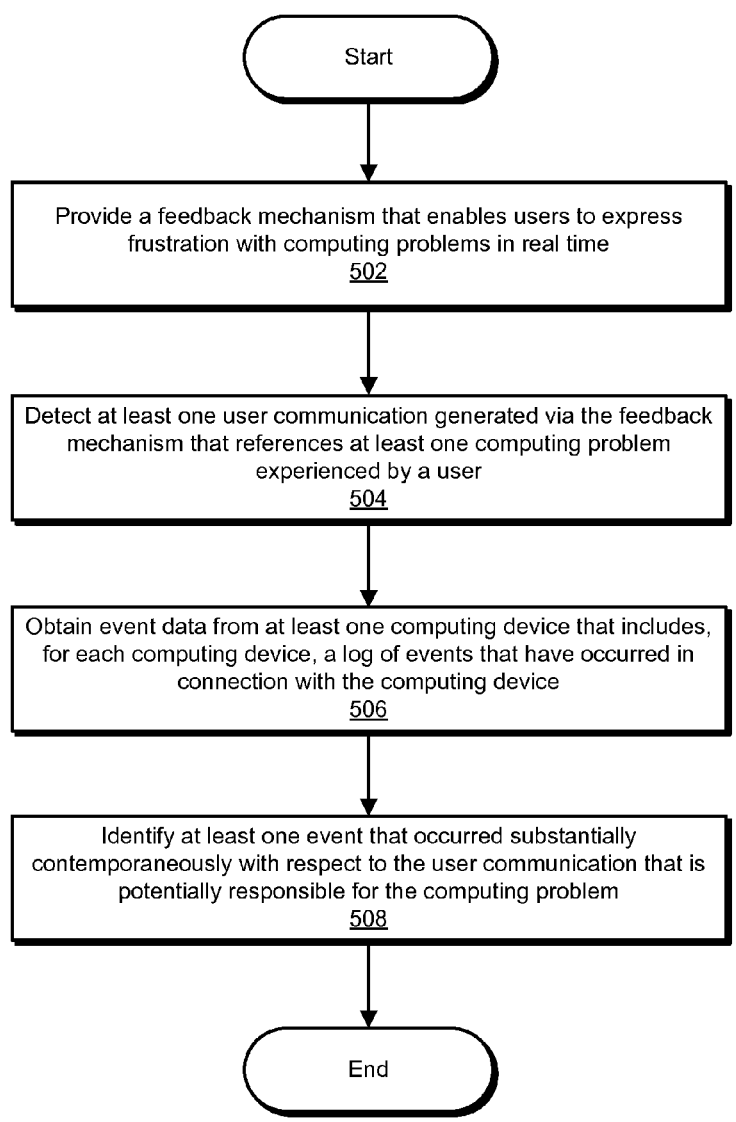
FIG. 5 is a flow diagram of an exemplary method for providing feedback mechanisms that enable users to express frustration with computing problems in real time.

Although the various feedback mechanisms described and/or illustrated herein have been described and/or illustrated in the context of social-network services, in some embodiments these feedback mechanisms may simply enable users to express their frustration with computing problems in real time without the aid of social-network services. FIG. 5 is a flow diagram of an exemplary computer-implemented method 500 for providing feedback mechanisms that enable users to express frustration with computing problems in real time without the aid of social-network services. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 710 in FIG. 7, and/or portions of exemplary network architecture 800 in FIG. 8.

As illustrated in FIG. 5, at step 502 one or more of the various systems described herein may provide a feedback mechanism that enables users to express frustration with computing problems in real time. For example, feedback module 104 in FIG. 1 may, as part of computing devices 222(1)-(N) in FIG. 2, enable users to report their frustration with computing problems in real time to a backend device, such as computing-health server 212.

The systems described herein may perform step 502 in a variety of ways. For example, computing device 222(1) may include feedback module 104. In this example, feedback module 104 may enable a user of computing device 222(1) to generate and transmit a message that expresses frustration with a computing problem the user is experiencing in real time to computing-health server 212.

Figure 6:
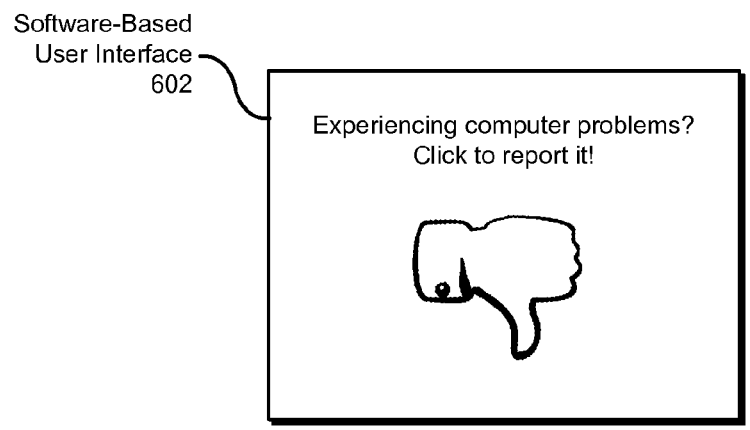
FIG. 6 is a block diagram of an exemplary software-based user interface for a feedback mechanism.

As with prior embodiments, a user of computing device 222(1) may interact with feedback module 104 using software-based and/or hardware-based user interfaces, such as software-based interface 602 in FIG. 6 and hardware-based user interface 228(1) in FIG. 2. For example, when a user of computing device 222(1) experiences a computing problem, the user may click on or select the "thumbs down" graphic displayed in software-based user interface 602 in FIG. 6. Feedback module 104 may then in turn transmit a message to computing-health server 212 that indicates that the user is experiencing problems with his/her computer. Similarly, the user may push a hardware-based "panic" button (i.e., hardware-based user interface 228(1) in FIG. 2), which may in turn transmit a message to computing-health server 212 that indicates that the user is experiencing problems with his/her computer. As with prior embodiments, these feedback mechanisms may enable users to input or select text and/or graphics that identify (either generally or specifically) the computing problems the users are experiencing.

Returning to FIG. 5, at step 504 the systems described herein may detect at least one user communication generated via the feedback mechanism that references at least one computing problem expressed by a user. For example, detection module 106 in FIG. 1 may, as part of computing-health server 212 in FIG. 2, obtain or receive a user complaint generated by feedback module 104 from computing device 222(1).

At step 506, the systems described herein may obtain event data from at least one computing device that includes, for each computing device, a log of events that have occurred in connection with the computing device. For example, correlation module 108 in FIG. 1 may, as part of computing-health server 212 in FIG. 2, obtain or receive event data from one or more of computing devices 222(1)-(N).

At step 508, the systems described herein may identify, by analyzing the event data, at least one event that occurred substantially contemporaneously with respect to the user communication that is potentially responsible for the computing problem referenced in the user communication. For example, correlation module 108 in FIG. 1 may, as part of computing-health server 212 in FIG. 2, identify at least one event within the event data obtained in step 506 that occurred substantially contemporaneously with respect to the user communication and that is potentially responsible for the computing problem referenced in the user communication detected in step 504. Upon completion of step 506, exemplary method 500 in FIG. 5 may terminate.

As with prior embodiments, the systems described herein may perform step 508 in a variety of ways and in a variety of contexts. In one example, correlation module 108 may correlate the computing problem referenced in the user communication detected in step 504 with at least one event that is potentially responsible for the same by collecting, aggregating, and/or analyzing (using, e.g., one or more heuristics) event and/or health data from one or more computing devices, such as the installation or user base of a security-software publisher. For example, if correlation module 108 receives thousands of user complaints referencing various operating-system problems less than 24 hours after the widespread release of an operating-system patch or update, then correlation module 108 may determine that the operating-system update may be at least partially responsible for the operating-system problems experienced by the users. Similarly, if correlation module 108 receives hundreds of user complaints referencing browser-connection problems less than 12 hours after an ISP announces it has begun maintenance on its servers, then correlation module 108 may determine that the ISP's maintenance procedures may be at least partially responsible for the browser-connection problems experienced by the users.

As detailed above, by providing a feedback mechanism that enables users to express their frustration with computing problems in fun and creative ways (such as via a social-network service), the systems and methods described herein may incentivize users to indicate when they are experiencing computing problems, thereby potentially enabling the accurate identification of points in time when users are experiencing such problems. Moreover, by collecting, aggregating, and/or analyzing this feedback, along with event and/or health data, from thousands or potentially millions of computing devices (such as the installation base of a security-software publisher), these systems and methods may accurately identify and/or resolve events that are potentially responsible for causing such problems.

Figure 7:
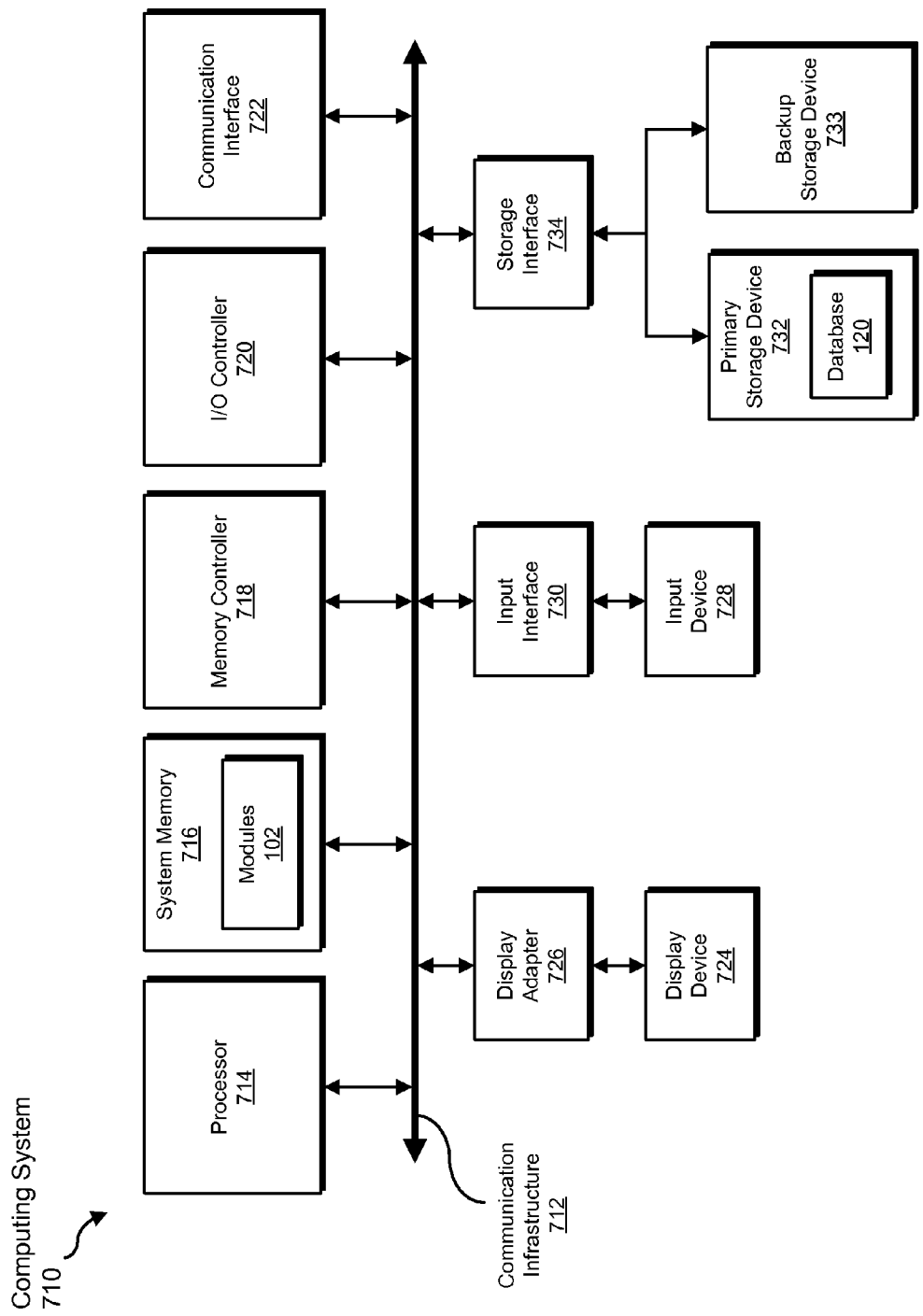
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the providing, detecting, correlating, enabling, determining, receiving, identifying, and/or resolving steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as providing, detecting, correlating, enabling, determining, receiving, identifying, and/or resolving.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the providing, detecting, correlating, enabling, determining, receiving, identifying, and/or resolving steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the providing, detecting, correlating, enabling, determining, receiving, identifying, and/or resolving steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the providing, detecting, correlating, enabling, determining, receiving, identifying, and/or resolving steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the providing, detecting, correlating, enabling, determining, receiving, identifying, and/or resolving steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
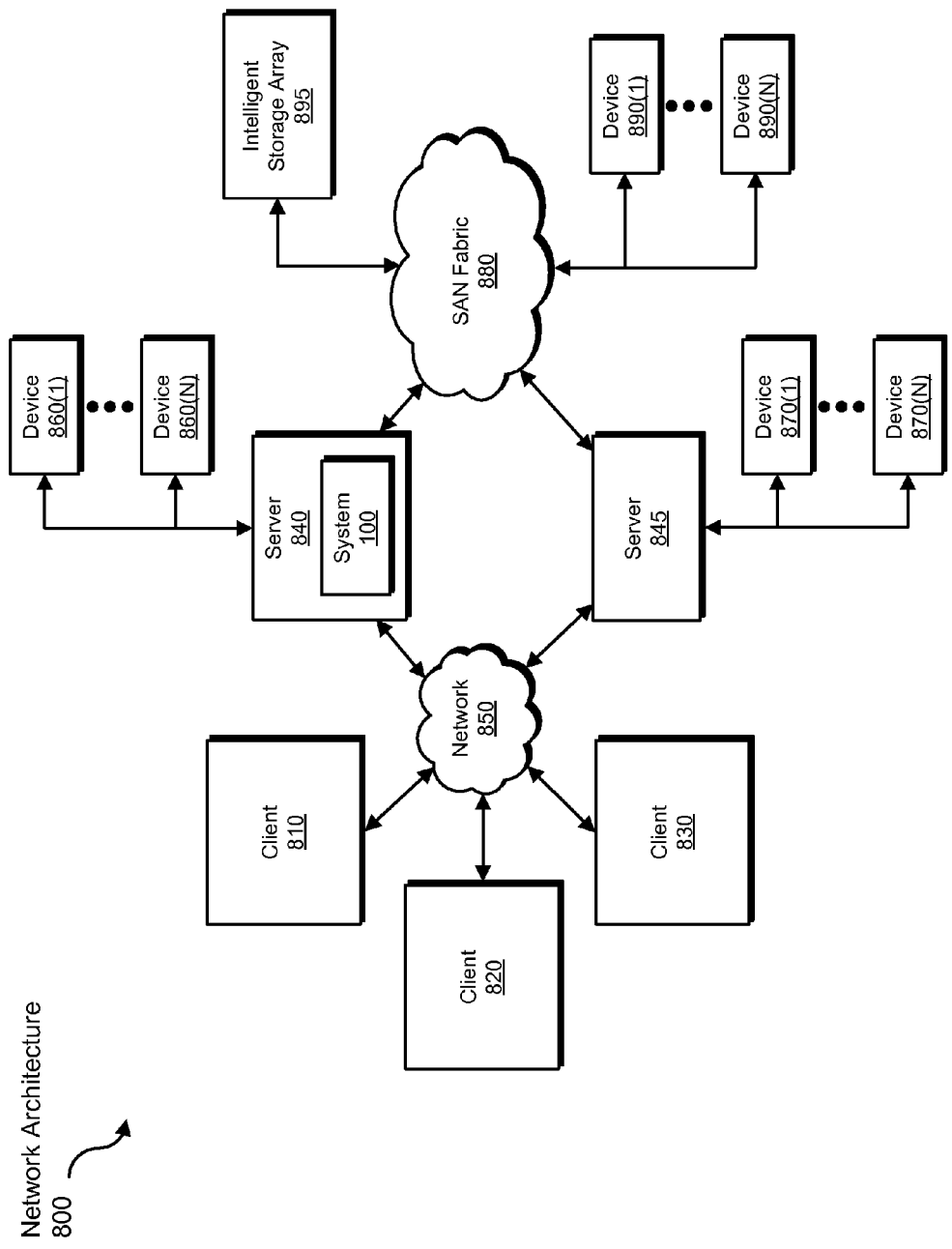
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the providing, detecting, correlating, enabling, determining, receiving, identifying, and/or resolving steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for correlating computing problems referenced in social-network communications with events potentially responsible for the same. In one example, such a method may include: 1) providing a social-network feedback mechanism that enables users to express frustration with computing problems in real time via a social-network service, 2) detecting at least one user communication generated via the feedback mechanism that references at least one computing problem experienced by a user, and then 3) correlating the computing problem referenced in the user communication with at least one event potentially responsible for the computing problem.

In one example, the feedback mechanism may enable users to express frustration with computing problems in real time via the social-network service using text and/or graphics. The feedback mechanism may also include a software-based and/or hardware-based user interface. In some examples, the feedback mechanism may represent at least a portion of a client-side and/or server side application.

Detecting the user communication may include determining that the user communication contains a specific keyword, determining that the user communication was posted via a specific social-network add-on, and/or determining that the user communication was posted to a specific social-network channel. In one example, correlating the computing problem referenced in the user communication with at least one event potentially responsible for the computing problem may include: 1) determining when the user communication occurred (i.e., when the user communication was generated, transmitted, and/or received), 2) obtaining event data from at least one computing device that includes, for each computing device, a log of events that have occurred in connection with the computing device, and then 3) identifying, by analyzing the event data, at least one event that occurred substantially contemporaneously with respect to the user communication that is potentially responsible for the computing problem.

In one example, obtaining event data from at least one computing device may include obtaining event data from computing devices within a software user base. Examples of events that may be logged within such event data include, without limitation, installing software, executing software, removing software, updating software, patching software, accessing a file, accessing a website, connecting to an access point, connecting to a network, and/or interacting with an Internet vendor.

In one example, the method may also include providing users of the feedback mechanism with access to information that identifies the number of computing problems experienced by an individual user of the feedback mechanism and/or the number of computing problems experienced by users of the feedback mechanism as a whole. The method may also include attempting to resolve the computing problem referenced in the user communication.

In an additional embodiment, a computer-implemented method for providing feedback mechanisms that enable users to express frustration with computing problems in real time may include: 1) providing a feedback mechanism that enables users to express frustration with computing problems in real time, 2) detecting at least one user communication generated via the feedback mechanism that references at least one computing problem experienced by a user, 3) obtaining event data from at least one computing device that includes, for each computing device, a log of events that have occurred in connection with the computing device, and then 4) identifying, by analyzing the event data, at least one event that occurred substantially contemporaneously with respect to the user communication that is potentially responsible for the computing problem referenced in the user communication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, repair module 112 in FIG. 1 may transform a property or characteristic of one or more of computing devices 222(1)-(N) by resolving a computing problem experienced by the same.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for correlating computing problems referenced in social-network communications with events potentially responsible for the same, the method being performed by a computing device comprising at least one processor, the method comprising:
   providing a social-network feedback application hosted by a third party that enables users to generate messages that express frustration with computing problems and post the messages in real time to a social-network service;
   detecting a plurality of user communications generated via the social-network feedback application that reference at least one computing problem experienced by a plurality of users, wherein each of the plurality of user communications express general frustration with a corresponding computer without providing specific technical details of the computing problem;
   aggregating the plurality of user communications;
   analyzing the aggregated user communications by:
      determining when the aggregated user communications occurred;
      identifying a temporal range that preceded the occurrence of the aggregated user communications; and
      identifying an event that occurred within the temporal range;
   correlating, based on the analysis of the aggregated user communications, the computing problem referenced in the user communications with the identified event that is potentially responsible for the computing problem.

2. The method of claim 1, wherein the social-network feedback application enables users to generate messages that express frustration with computing problems and post the messages in real time to the social-network service using at least one of:
   text;
   graphics.

3. The method of claim 1, wherein the social-network feedback application comprises at least a portion of at least one of:
   a client-side application;
   a server-side application.

4. The method of claim 1, wherein detecting the user communications comprises at least one of:
   determining that at least one of the user communications contains a specific keyword;
   determining that at least one of the user communications contains a specific tag;
   determining that at least one of the user communications was posted via a specific social-network add-on;
   determining that at least one of the user communications was posted to a specific social-network channel.

5. The method of claim 1, wherein correlating the computing problem reference din the user communication with the identified event that is potentially responsible for the computing problem comprises:
   obtaining event data from the at least one computing device associated with the plurality of user, wherein the event data comprises, for each computing device, a log of events that have occurred in connection with the computing device;
   determining, by analyzing the event data, that the identified event occurred within the temporal range and that the identified event is potentially responsible for the computing problem.

6. The method of claim 5, wherein obtaining the event data from the at least one computing device associated with the plurality of users comprises obtaining event data from computing devices within a software user base.

7. The method of claim 1, wherein the event comprises at least one of:
   installing software;
   executing software;
   removing software;
   updating software;
   patching software;
   accessing a file;
   accessing a website;
   connecting to an access point;
   connecting to a network;
   interacting with an Internet vendor.

8. The method of claim 1, further comprising providing users of the social-network feedback application with access to information that identifies at least one of:
   the number of computing problems experienced by an individual user of the social-network feedback application;
   the number of computing problems experienced by users of the social-network feedback application as a whole.

9. The method of claim 1, wherein the third party comprises a security-software publisher.

10. The method of claim 1, tangibly embodied as computer-executable instructions on a non-transitory computer-readable-storage medium.

11. The computer-implemented method of claim 1, wherein correlating the computing problem reference din the user communications with the identified event that is potentially responsible for the computing problem comprises:
   obtaining event data from at least one computing device associated with the plurality of users, wherein the event data comprises, for each computing device, a log of events that have occurred in connection with the computing device;
   obtaining health data from at least one computing device associated with the plurality of users, wherein the health data identifies, for each computing device, the health of the computing device at various points in time;
   determining, by analyzing the event data and the health data, that the identified event occurred within the temporal range and that the identified event is potentially responsible for the computing problem.

12. The computer implemented method of claim 11, wherein determining, by analyzing the event data and the health data, that the identified event occurred within the temporal range and that the identified event is potentially responsible for the computing problem comprises:
   determining, by analyzing the health data, when the computing problem referenced in the user communications occurred;
   determining, by analyzing the event data, that the identified event occurred substantially contemporaneously with respect to the computing problem reference din the user communications.

13. A computer-implemented method for providing feedback mechanisms that enable users to express frustration with computing problems in real time, the method being performed by a computing device comprising a processor, the method comprising:
   providing a feedback application that enables users to generate messages that express frustration with computing problems and post the messages in real time to a backend service;
   detecting a plurality of user communications generated via the feedback application that reference at least one computing problem experienced by a plurality of users, wherein each of the plurality of user communications express general frustration with a corresponding computer without providing specific technical details of the computing problem;
   aggregating the plurality of user communications;
   analyzing the aggregated user communications by:
      determining when the aggregated user communications occurred;
      identifying a temporal range that preceded the occurrence of the aggregated user communications;
   obtaining event data from at least one computing device associated with the plurality of users, wherein the event data comprises, for each computing device, a log of events that have occurred in connection with the computing device;
   identifying, by analyzing the event data, at least one event that occurred within the temporal range that is potentially responsible for the computing problem referenced in the user communications.

14. The method of claim 13, wherein the feedback application enables users to generate messages that express frustration with computing problems and post the messages in real time using at least one of:
   text;
   graphics.

15. The method of claim 13, wherein the backend service is provided by a security-software publisher.

16. The method of claim 13, wherein obtaining the event data from the at least one computing device associated with the plurality of users comprises obtaining event data from computing devices within a software user base.

17. The method of claim 13, tangibly embodied as computer-executable instructions on a non-transitory computer-readable-storage medium.

18. A system for correlating computing problems referenced in social-network communications with events potentially responsible for the same, the system comprising:
   a social-network feedback module programmed to enable users to express frustration with computing problems by providing a social-network feedback application hosted by a third party that enables users to generate messages that express frustration with computing problems and post the messages in real time to a social-network service;
   a detection module programmed to detect a plurality of user communications generated via the social-network feedback application that reference at least one computing problem experienced by a plurality of users, wherein each of the plurality of user communications express general frustration with a corresponding computer without providing specific technical details of the computing problem;
   a determination module and an identification module collectively programmed to:
      aggregating the plurality of user communications;
      analyzing the aggregated user communications by:
         determining when the aggregated user communications occurred;
         identifying a temporal range that preceded the occurrence of the aggregated user communications;
         identifying an event that occurred within the temporal range;
   a correlation module programmed to correlate, based on the analysis of the aggregated user communications, the computing problem referenced in the user communications with the identified event that is potentially responsible for the computing problem;

at least one processor configured to execute the social-network feedback module, the detection module, the determination module, the identification module, and the correlation module.

19. The system of claim 18, further comprising an access module programmed to provide users of the social-network feedback application with access to information that identifies at least one of:

the number of computing problems experienced by an individual user of the social-network feedback application;

the number of computing problems experienced by users of the social-network feedback application as a whole.

20. The system of claim 18, wherein the third party comprises a security-software publisher.

\* \* \* \* \*

UNITED STATES PATENT AND TRADEMARK OFFICE
CERTIFICATE OF CORRECTION

PATENT NO.           : 9,148,353 B1
APPLICATION NO.      : 12/770171
DATED                : September 29, 2015
INVENTOR(S)          : Joseph Pasqua and Mark Bregman It is certified that error appears in the above-identified patent and that said Letters Patent is hereby corrected as shown below:

In The Claims

Claim 5, at column 20, lines 52 to 53, should read:
The method of claim 1, wherein correlating the computing problem referenced in the user communications with the Claim 5, at column 20, line 57, should read:
associated with the plurality of users, wherein the event Claim 11, at column 21, lines 28 to 29, should read:
The computer-implemented method of claim 1, wherein correlating the computing problem referenced in the Claim 12, at column 21, line 45, should read:
The computer-implemented method of claim 11, Claim 12, at column 21, line 55, should read:
respect to the computing problem referenced in the user Claim 13, at column 21, lines 59 to 60, should read:
computing problems in real time, the method being performed by a computing device comprising at least one processor, the Claim 13, at column 21, line 64, should read:
problems and transmit the messages in real time to a backend Claim 18, at column 22, lines 56 to 57, should read:
aggregate the plurality of user communications;
analyze the aggregated user communications by:

Signed and Sealed this
Twenty-second Day of March, 2016

Michelle K. Lee
*Director of the United States Patent and Trademark Office*